United States Patent [19]

James

[11] Patent Number: 4,984,123

[45] Date of Patent: Jan. 8, 1991

[54] LATCHING SWITCHING DEVICE HAVING CURRENT RESPONSIVE RELEASE

[75] Inventor: Gene L. James, Princeton, Ind.

[73] Assignee: Potter & Brumfield, Inc., Princeton, Ind.

[21] Appl. No.: 380,955

[22] Filed: Jul. 17, 1989

[51] Int. Cl.[5] ........................ H02H 5/04; H01H 71/16

[52] U.S. Cl. ........................................ 361/26; 337/75; 337/66

[58] Field of Search ........................ 337/66, 67, 68, 69, 337/70, 71, 72, 73, 74, 75; 361/23, 24, 25, 26, 32; 318/439

[56] References Cited

U.S. PATENT DOCUMENTS

| | | | |
|---|---|---|---|
| 3,456,125 | 7/1969 | Cousin et al. | 307/202 |
| 3,683,239 | 8/1972 | Sturman . | |
| 3,737,736 | 6/1973 | Stampfli . | |
| 4,068,203 | 1/1978 | Unger | 337/56 |
| 4,092,623 | 5/1978 | Kirkup | 337/66 |
| 4,123,737 | 10/1978 | Hoagland, Jr. | 337/68 |
| 4,166,993 | 9/1979 | Krasser | 337/66 |
| 4,227,231 | 10/1980 | Hansen et al. | 361/154 |
| 4,263,928 | 4/1981 | Kobayashi et al. | 137/39 |
| 4,363,016 | 12/1982 | Unger | 337/56 |
| 4,370,638 | 1/1983 | Takeda et al. | 335/186 |
| 4,376,896 | 3/1983 | Takeda et al. | 307/115 |
| 4,451,865 | 5/1984 | Warner et al. | 361/23 |
| 4,489,360 | 12/1984 | Kraicar et al. | 361/187 |
| 4,518,943 | 5/1985 | Giessner | 337/68 |
| 4,532,570 | 7/1985 | Thornley et al. | 361/93 |
| 4,543,515 | 9/1985 | Suzuki | 318/293 |
| 4,754,362 | 6/1988 | Beller | 361/31 |

FOREIGN PATENT DOCUMENTS

| | | |
|---|---|---|
| 0247508 | 2/1987 | European Pat. Off. . |
| 0237296 | 9/1987 | European Pat. Off. . |

*Primary Examiner*—Broome H.
*Attorney, Agent, or Firm*—Eugene S. Indyk; John F. Moran

[57] ABSTRACT

A push-push (make-break) switch (43) including a thermally operated circuit breaker release is adapted for controlling an electric motor (42). The switch (43) may be employed by itself or used in conjunction with a standard control switch (41) connected to auxiliary contacts (15 and 18) which are normally closed but opened when switch (43) is activated. When switch (43) is momentarily activated, it becomes latched to continue operation of the motor (42) until the motor stalls upon completion of a task. The increased current draw of the motor (42) is sensed by a bi-metalic element (27) whose free end moves to automatically release the switch (43) and disrupt its continuity path. The switch (43) is in a compact, self-contained, design which provides various different operational features. In automotive applications, switch (43) provides convenient express operation of motor operated accessories such as power windows and the like.

8 Claims, 7 Drawing Sheets

LATCHING SWITCHING DEVICE HAVING CURRENT RESPONSIVE RELEASE

BACKGROUND OF THE INVENTION

The present invention relates to electrical control switching, and it relates, more particularly, to a switching arrangement having an internal latch that is released responsive to an increase in current such as produced by stalling an electric motor.

In automobiles having power windows operated by motors, it is convenient and also a safety feature to be able to activate a window, such as the driver's window, by means of a momentary activation which automatically de-activates itself upon the occurrence of an extreme window position. The extreme position of the window may be either fully opened or completely closed. The momentary activation typically involves setting a switch in a single fleeting operation. The switch then sustains the operation until completion. The switch and possible additional circuitry is made to sense and automatically responds to the occurrence of the completed task by de-activation. Typically, the sensing is done by monitoring the current draw of the motor used to provide the mechanical work which stalls upon completing the task.

Various arrangements have been devised to provide this feature, but they all suffer from one or more of the following drawbacks. Although a number of conventional implementations recognize the advantage of the control switch somehow sensing the motor current directly, most of these conventional implementations use electromagnetic means in a single control switch involving coils. Such a multipurpose switch is rather complex and they are costly to manufacture. Furthermore, another conventional approach involves additional sensing devices such as limit switches which also requires additional wiring in the harnesses which is expensive to implement. The use of timing arrangements aside from the high costs involved doesn't appear feasible and also may reduce the operational life expectancy of the driving motor. In any case, it is desirable to implement this operational feature in a separate compact arrangement of low complexity and low cost instead of incorporating it directly within the normal control switch.

It would be highly desirable to provide a low cost device for this control function which is reliable and safe. With the increasing amount of remote and powered controls in automobiles, such a device may be used for power sun roofs, power seats, trunk latches, electric antennas, and the like in vehicles. Further even in other completely different applications, such a control device may be used to advantage.

SUMMARY OF THE INVENTION

It is an object of the invention to provide a control device that is small, low cost, reliable, and self-contained so as to obviate the need for additional devices and associated wiring.

The present invention takes the form of a compact mechanically operated control switch having a latch in the closed position that is automatically released by a thermal current sensing mechanism.

In some of the aspects of the invention, the control switch is embodied as a push-push manual switch including a bi-metallic current sensing mechanism for transferring contacts at a predetermined current level.

The control switch provides the capability of interrupting the current manually prior to high current sensing.

In some of the further aspects of the invention, the control switch is housed in a protective case of electrically insulating material. The control switch includes a secondary or auxiliary set of contacts useful for monitoring the primary contacts or to "lock out" or interrupt current to a secondary load when the primary load is in operation. The control switch senses current and in response provides an automatic break. The automatic break provides an internal override over manual reset due to current sensing via a trip-free interrupt mechanism.

In some of the still further aspects of the invention, a button serves as the actuator and provides a movable slide on which a traveling contact arm is guided. The traveling contact arm carries the movable contact and is mechanically biased by a spring under compression. This spring enables the traveling contact arm and the movable contact to break the continuity path through the switch while the button is being manually depressed. Rapid movement of the traveling contact arm breaks the continuity path quickly. Due to pivoting tabs on the traveling contact arm and the force of this spring being displaced from the tabs, the traveling contact arm pivots while making and breaking its movable contact with the other contact in the switch.

A device in accordance with the principles of this invention can serve as a circuit breaker, a single control switch, or be used in combination with conventional switch controls. In applications utilizing an electric motor stalling upon the completion of a task, the thermal release in the device provides an automatic release from a closed path latching position.

BRIEF DESCRIPTION OF THE DRAWING

Features of the invention and additional objects of the invention will be more readily appreciated and better understood by reference to the following detailed description which should be considered in conjunction with the drawing.

DETAILED DESCRIPTION

Figure 1:
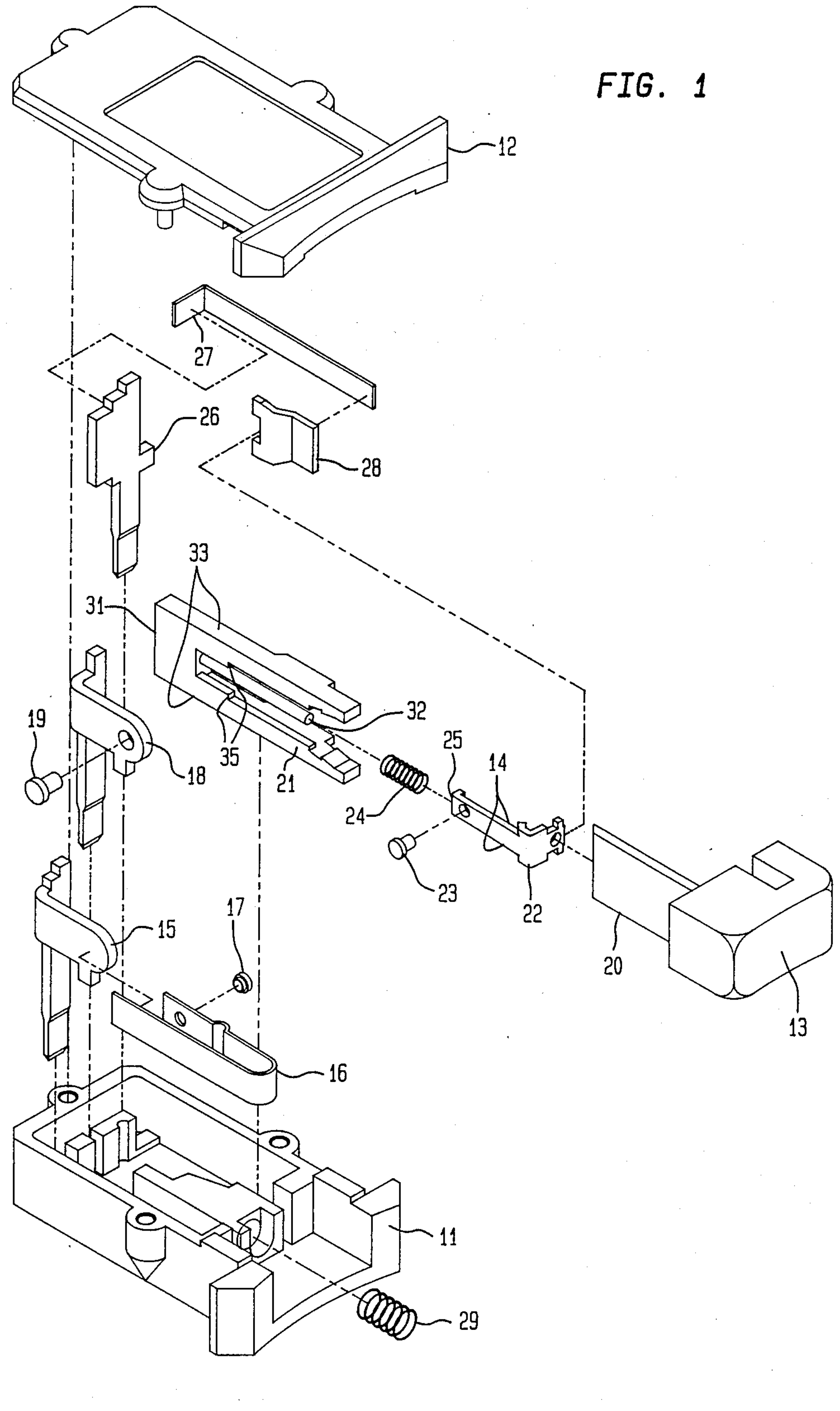
FIG. 1 is an exploded view in perspective of the various internal components of the control switch grouped into four different assemblies.

FIG. 1 provides an exploded view of the illustrative control switch in accordance with the invention. Case 11, cover 12, and button 13 together provide the external housing of the control switch. Case 12 comprises molded insulating material which provides the main vehicle for housing and containing the component parts. The control switch comprises a number of assemblies wherein various component parts interact to provide different functions. Terminal 15, and spring 16 which maintains contact pressure on contact 17 form the auxiliary contact assembly. A stationary contact assembly includes terminal 18 of suitable conductive material and contact 19. Contact 19 may be either of double-sided or cold-headed construction. This assembly provides continuity either with the auxiliary contact assembly or with the latch assembly. A slide assembly includes slide 21 which mates and locks into diametrically located slots on button 13. On slide 21, movable contact arm 22 carries contact 23. Contact arm 22 travels with the slide 21 due to the pressure of spring 24 which rotates the contact arm about pivoting tabs 14 so that hooking tab 25 catches on the interior end 31 of slide 21. Spring 24 rides on center post 32 of slide 21 and when assembled provides the pressure on the moveable contact arm 21 while two rails 33 provide guided linear movement. Terminal 26 has bi-metal element 27 spot welded on it. Latch 28 is spot welded on element 27. Return spring 29 rests in compression under button 13. Also, evident from FIG. 1 is the general manner in which the assemblies are placed in case 11.

Case 11, in addition to serving as a vehicle to house and contain the component parts and assemblies, features a front bezel as an integral component part of the case. It is to be understood that it is apparent to those skilled in the art that other versions may be readily devised wherein the bezel is a separate part or retaining clips may be incorporated into the case or bezel to accommodate front panel mounting. Various colors and other styles of bezels are also readily apparent.

The rear section of case 11 incorporates cavities for mounting the subassemblies and terminating the device. Other versions of case 11 may be utilized in custom designs to accommodate various standard female connector assemblies as well as "quick connect terminals", circuit boards, or leads.

Figure 2:
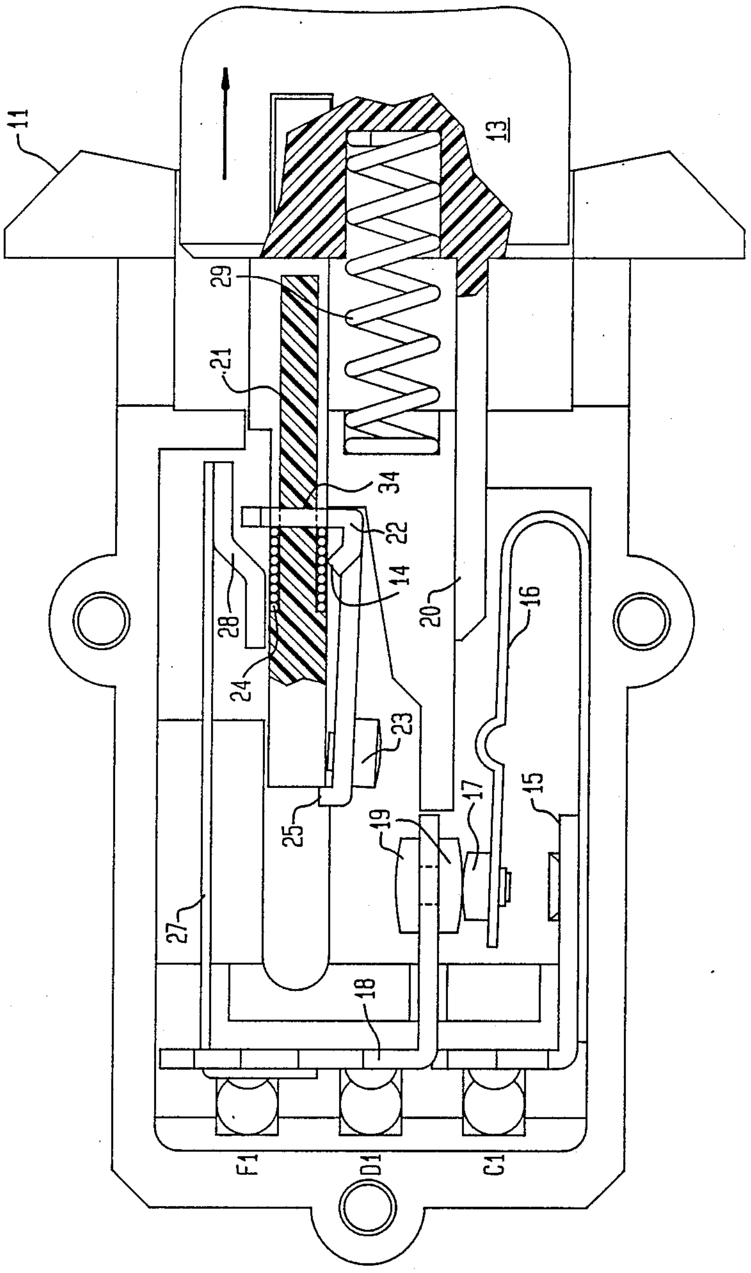
FIG. 2 depicts the normally open position of the control switch.

FIG. 2 has case 11 with cover 12 removed to illustrate the internal configuration of the component parts of the control switch. Button 13 is presented in its normallY open position and slide 21 is fastened to move with the button. In this position, auxiliary contacts 17 maintains contact with stationary contact 19 so that the circuit is closed and continuity is maintained between terminals 15 and 18 which extend out of the bottom of case 11 for electrical connection thereto. The latch assembly is unlatched since spring 24 in the breakaway portion holds contact arm 22 back away from latch 28 and against locking tab 25 hooked on the interior end 31 of slide 21. Reference numeral 34 indicates the location of a pair of shoulders reference numeral 35 of the interior portions of rails 33. See FIG. 1 for shoulders 35 and rail 33. This pair of shoulders provides a rest position for contact arm 22 against which the return force of return spring 29 is exerted. Therefore, primary contact 23 rests in a position away from contact 19 and is open.

Figure 3:
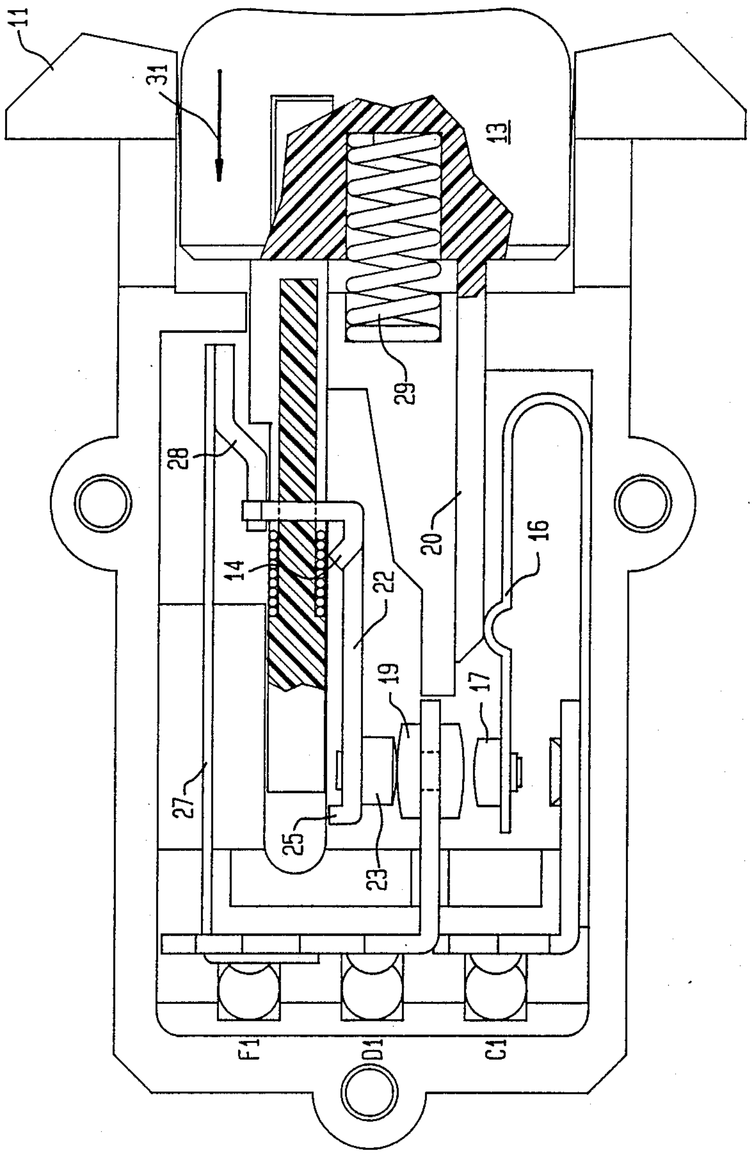
FIG. 3 illustrates the control switch in the normally closed and latched position.

FIG. 3 illustrates the control switch after activation of button 13 in the direction of arrow 31. This position is now latched since contact arm 22 is locked up against latch 28. Return spring 29 is compressed. Contacts 19 and 23 are closed and contact 17 is opened due to the caming action between button slide 20 against spring 16. The control switch maintains this position until transfer occurs to either the position of FIG. 2 due to thermal displacement of bi-metal element 27 upon the occurrence of a threshold current heat or due to mechanical unlatching illustrated in FIG. 5.

Figure 4:
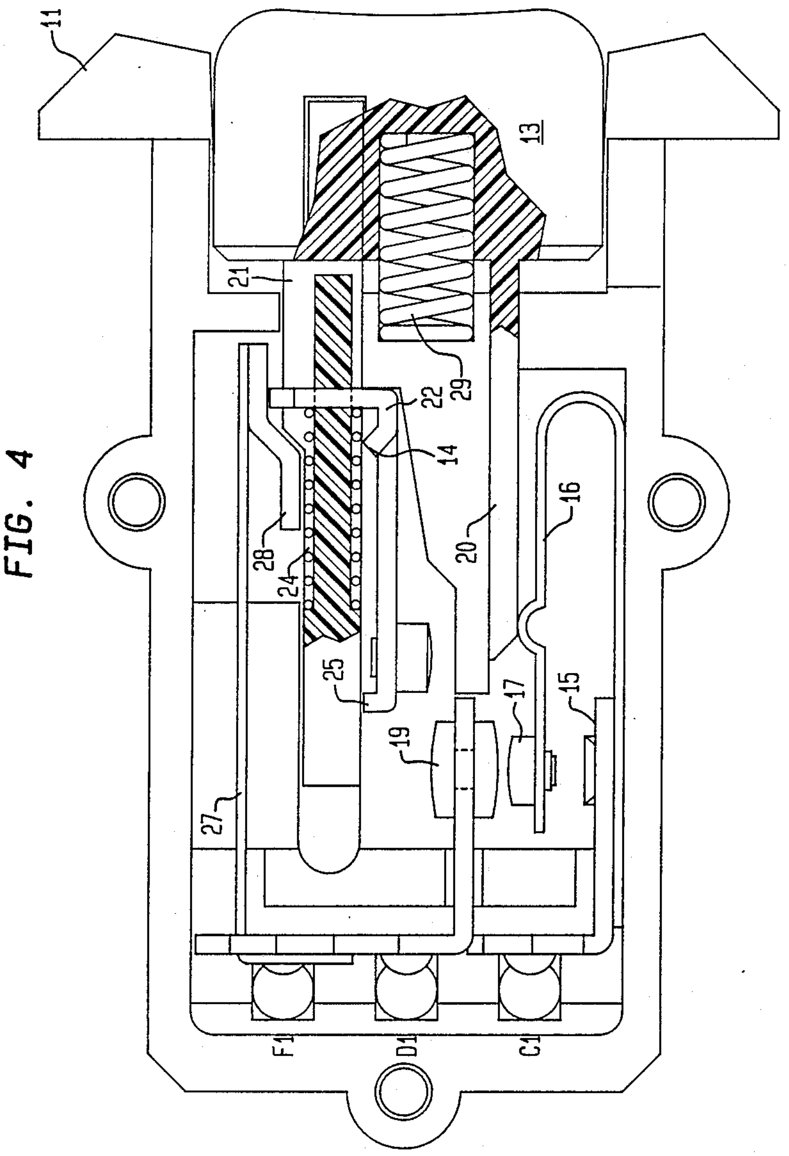
FIG. 4 demonstrates the control switch with the button manually depressed after automatic thermal unlatching has occurred.

FIG. 4 depicts button 13 manually held in after automatic unlatching has occurred due to threshold current displacement of latch 28 on bi-metal element 27. It should be pointed out that since contact arm 22 is moved independently of this position by spring 24, the thermal release is free to occur while button 13 is held in. Contacts 19 and 23 are open as well as contacts 17 and 19 being open which disrupts current flow through the control switch and possible damage of a motor in a stalled position. This spring 24 provides an automatic override over manual operation of button 13 to protect against excess current flow through the control switch and devices in circuit with it.

Figure 5:
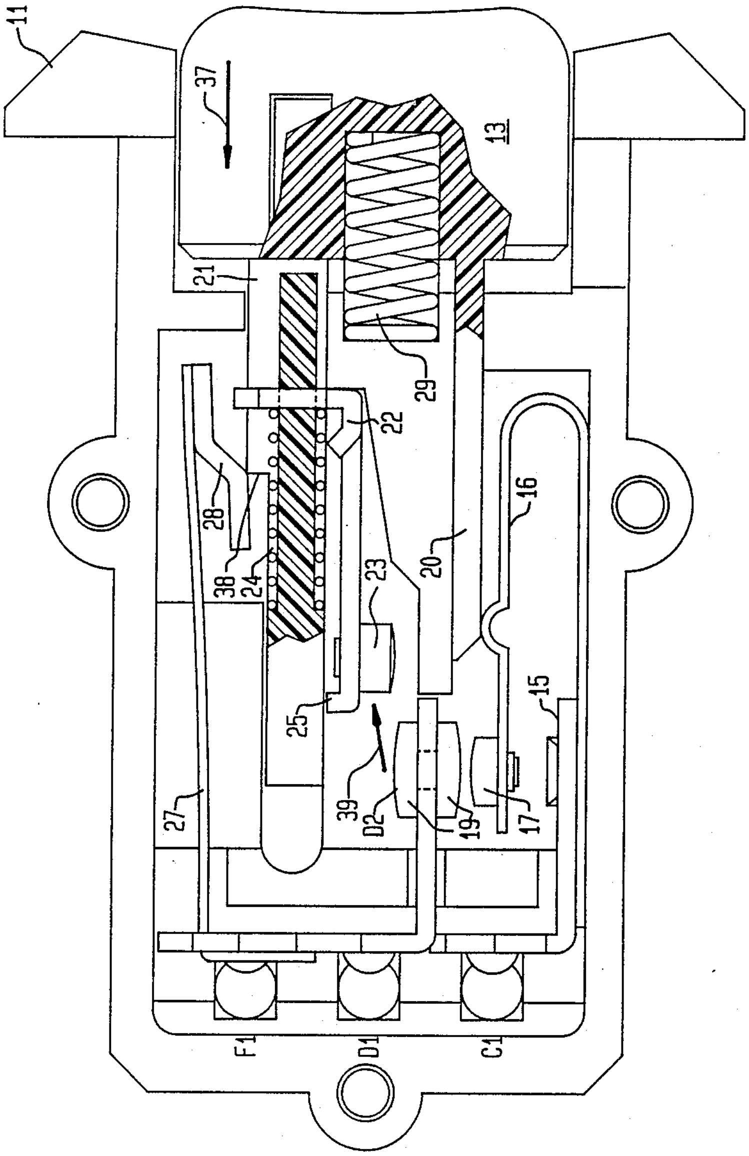
FIG. 5 illustrates the manual trip position of the control switch.

FIG. 5 demonstrates the manual trip position. The slide assembly is manually forced to bottom on case 11. The forward motion (arrow 37) compresses return spring 29 and the shoulder ramp 38 on slide 21 has displaced latch 28 and bi-metal element 27. When latch 28 releases contact arm 22, spring 24 forces the contact arm rapidly in the direction of arrow 39 to its normally open position, or rest position, against the forward part of case 11. Contacts 19 and 23 are open and contacts 17 and 19 are open in this position. When manual pressure is released on button 13, the button moves out due to return spring 29 and the control switch returns to the position of FIG. 2 and is now ready to be manually reset by being momentarily activated.

Figure 6:
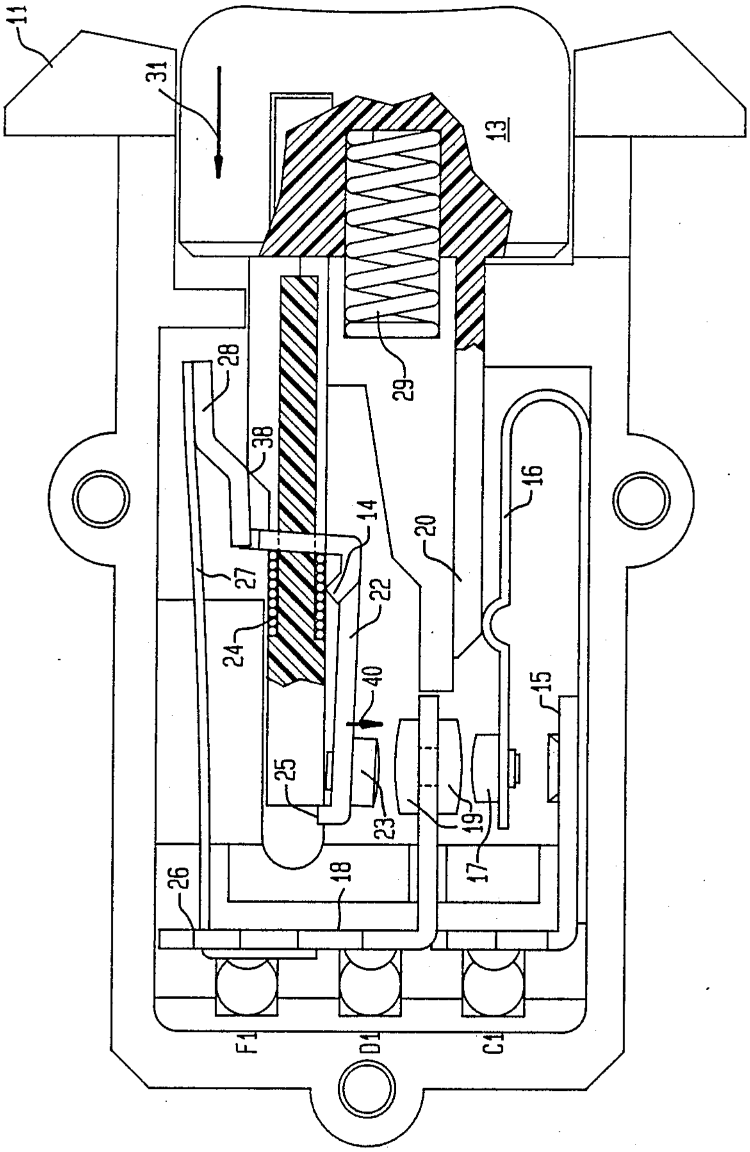
FIG. 6 demonstrates the control switch in the re-set position.

FIG. 6 illustrates the manual re-set position. The button is pushed forward into the case until button 13 bottoms on case 11. Contact arm 22 is held at the forward end (interior end) of slide 21. When button 13 is released, the slide assembly moves back due to the force exerted by return spring 29 until contact arm 28 latches with the latch assembly and contact arm 22 rotates in the direction of arrow 40 to close contacts 23 and 19.

The operation of the control switch will now be summarized. The control switch assumes a normal position wherein button 13 protrudes out of case 11 due to the action of return spring 29. An electrical circuit path is completed between contacts 17 and 19 which are connected to terminals 15 and 18 while the circuit path is open between terminals 18 and 26. In this position, the auxiliary contacts are closed and the primary contacts are open.

To activate the control switch, button 13 is depressed which moves contact arm 22 toward the rear of the switch until it slides past latch 28. When button 13 is released, it travels out partially until movable contact arm 22 rests against latch 28. In this position, an electrical circuit is completed between terminals 18 and 26 via bi-metal element 27, latch 28, movable contact arm 22 and contacts 23 and 19. An outward force is maintained on button 13 since return spring 29 has a greater spring constant than spring 24. In this position, the control switch can become unlatched in two ways.

The first way is manually by depressing button 13 further to assume a manual trip position. At this time, slide 21, which also is moved further into the control switch with button 13, has a portion of increased width due to shoulder 38. Shoulder 38 engages latch 28 and moves it clear of movable contact arm 22 which releases the contact arm so that spring 24 moves it back away from contact 19. At the same time, button slide 20 forces spring 16 back and separates contacts 17 and 19 to keep them open. This manual operation provides a safety feature for interrupting operation.

The second way of unlatching the control switch is automatically in response to an increased current flow between terminals 18 and 26. The increased current produces heat in bi-metal element 27. As the temperature is elevated the different rates of expansion in element 27 produces a mechanical displacement until latch 28 releases contact arm 22.

After bi-metal element 27 cools down, depression of button 13 resets the control switch which again assumes the latched position. Although the cool down interval is affected by the ambient temperature, an arrangement for dissipating the heat of element 27 may be readily devised to provide suitable repeatability for a given application.

It should be understood that the auxiliary contact assembly is optional and may be eliminated without changing the remaining portion of the control switch. This has the advantage of reducing the overall size as well as the cost of the control switch.

Figure 7:
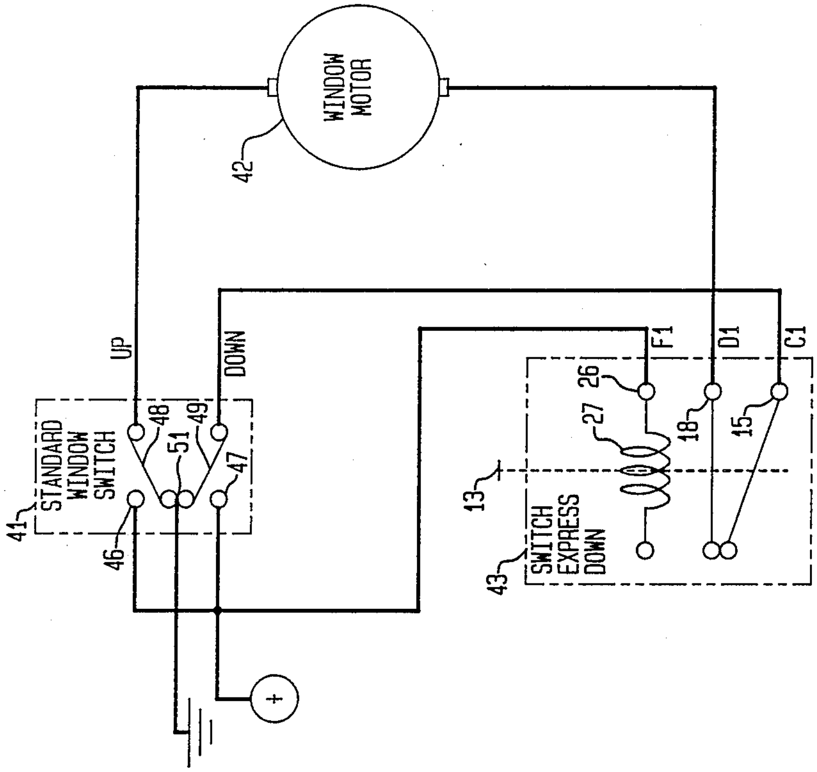
FIG. 7 is a circuit diagram wherein the control switch of the invention is connected to a conventional switch for operating an automatic power window.

FIG. 7 is a typical schematic diagram for an application of the inventive control switch for an automotive power window. The circuit of FIG. 7 basically includes three components which are the conventional window switch 41, the window motor 42 for controlling a window (not shown), and the electrical switch symbol 43 for the switch of FIG. 1. Power, which in this case is plus twelve volt battery potential, is applied to terminals 46 or 47 of switch 41 and terminal 26 of switch 43.

Both switches 41 and 43 are shown in their normal position. In switch 41, switch rotors 48 and 49, which are moved independently of each other, contact terminal 51 and are connected to ground potential (negative battery) so that window motor 42 is off. In switch 43, a conductive path is completed through auxiliary terminal 15 and stationary terminal 18. At this time, switch 41 can be manually activated to raise the window which changes the position of rotor 48 from terminal 51 to terminal 46 while rotor 49 remains stationary. To lower the window, rotor 49 moves from terminal 51 to terminal 47 as long as appropriate pressure is applied to a rocker button (not shown) which independently activates rotors 48 and 49. The position of switch 43 therefore allows switch 41 to function in its normal manner.

With switch 41 in the normal position indicated in FIG. 7, switch 43 provides an express down window feature by momentarily activating button 13 at which time it is simply pushed into the control switch. At this time, the path between terminals 15 and 18 are opened while the conductive path between terminals 26 and 18 is completed and motor 42 lowers the window. Since switch 43 latches up, it maintains this operation of lowering the window. When the window is fully down, motor 42 stalls and its current draw increases. The increased current raises the temperature of bi-metal element 27 which physically moves its free end and frees movable contact arm 22 from latch 28 secured to the free end. Return spring 29 then forces button 13 out which carries contact arm 22 on slide 21 to assume the position of FIG. 2.

It should be noted that a number of changes can be readily implemented in the illustrative application of FIG. 7 by those skilled in the art. For example, switch 43 can be connected to close the window fully so motor 42 stalls and the switch automatically unlatches. Also another switch in accordance with switch 43 can be employed to provide express window closing as well as opening. Furthermore, switch 43 can be used by itself without switch 41 present which would also eliminate the need for auxiliary contact 18 and its assembly. Of course, the circuit of FIG. 7 is only an illustrative application so that switch 43 may be used to provide any function wherein the powered motor stalls.

There has thus been shown and described a control switch which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. For example, the relative dimensions as well as the shape and arrangement of the physical components of the control switch may be changed to suit different electrical and operational features of the control switch. All such changes, modifications, variations and other uses and applications which do not depart from the spirit and scope of the invention are deemed to be covered by the invention which is limited only by the claims which follow.

I claim:

1. A switch device for controlling an electric current in a circuit, the switch device comprising:

(a) a movable contact arm and a stationary contact;

(b) an actuator operatively connected to effect movement of the movable contact arm;

(c) latching means for engaging a first end of the movable contact arm during movement to hold a latched position against a return force counteracting the movement while completing a continuity path between a second end of the movable contact arm and the stationary contact; and (d) bi-metallic means for unlatching the latching means responsive to the electric current exceeding a predetermined value, the bi-metallic means serially connected in the continuity path and being displaced by heat generated by the current to move the latching means and free the movable contact arm for return movement by the return force and disrupting the continuity path;

wherein the actuator comprises an external button and at least one elongated member extending into the device having an interior end, the elongated member having a slide wherein the movable contact arm travels; and wherein the elongated member has an elongated guide member located therein and extending along the slide, and a spring mounted on the guide member and providing a compressional force on the movable contact arm in a direction opposite to the movement of the actuator.

2. The switch device of claim 1, wherein the movable contact arm has a first end member at its first end, the first end member extending perpendicular to the movable contact arm and lateral notches engaging the slide and an aperture through which the guide member extends while providing a surface against which the spring produces the compressional force.

3. The switch device of claim 2, wherein the movable contact arm has a second end member at its second end which catches on the interior end of the elongated member when the latching means is not engaged.

4. The switch device of claim 3, wherein the actuator is a button and a return spring is located under the button to provide the return force.

5. The switch device of claim 4, wherein the return spring has a larger spring constant than that of the spring mounted on the guide member.

6. The switch device of claim 5, wherein the movable contact arm has a pair of pivoting tabs located on opposite sides of the first member at the first end, the pivoting tabs being the fulcrum upon which the movable contact arm pivots to make and break the continuity path.

7. The switch device of claim 6, further comprising:

(a) an auxiliary terminal and an auxiliary contact located on a spring arm;

(b) the button having a second elongated member extending into the switch device; and (c) the stationary contact having an opposed contact against which the auxiliary contact normally rests to provide a normally closed set of contacts which are opened when the button is activated and the second elongated member produces a force on the spring arm.

8. An apparatus for controlling the opening and closing of a window, comprising:

(a) push activated switch having a set of normally open contacts including a movable contact, the set of contacts being closable to provide a continuity path upon push activation, the movable contact being latched in position after activation to maintain the continuity path;

(b) a bi-metal element serially connected in the continuity path and having a latch member secured to one end of the element for holding the movable contact in position to maintain the continuity path, the bi-metal element capable of moving the latch member to release the movable contact and to disrupt the continuity path by opening the set of contacts in response to a predetermined magnitude of current flow through the bi-metal element;

(c) a motor having first and second terminals for raising or lowering a window; and (d) a window switch having at least one position in which the first terminal of the motor is connected to a first potential and the second terminal of the motor is connected to one of the set of contacts so that push activation of the push activated switch provides a current flow path through the motor until the window reaches a position at which the motor stalls, the push activated switch, the bi-metal element, and the motor being connected so that stalling of the motor increases the current flow through the bi-metal element to the predetermined magnitude, so as to disrupt the continuity path and de-energize the motor.

* * * * *